United States Patent [19]

Gomez

[11] Patent Number: 4,625,846
[45] Date of Patent: Dec. 2, 1986

[54] DEVICE FOR DISCONNECTING THE WHEELS FROM A VEHICLE'S OPTIONAL DRIVE

[75] Inventor: Miguel Gomez, Sao Paulo, Brazil

[73] Assignee: AVM-Auto Equipamentos Lida, Sao Paulo, Brazil

[21] Appl. No.: 624,537

[22] Filed: Jun. 25, 1984

[30] Foreign Application Priority Data

Oct. 10, 1983 [BR] Brazil ................................. 8305573

[51] Int. Cl.[4] .................... F16D 25/04; F16D 25/061
[52] U.S. Cl. .................................. 192/67 R; 180/247;
192/85 A; 192/85 V; 192/88 A; 403/1
[58] Field of Search ............... 192/67 R, 85 A, 85 V,
192/88 A, 49; 180/247; 403/1

[56] References Cited

U.S. PATENT DOCUMENTS

| 1,139,853 | 5/1915 | Dyer . | |
|---|---|---|---|
| 1,201,232 | 10/1916 | Archer . | |
| 1,440,341 | 12/1922 | Crispen . | |
| 2,620,054 | 12/1952 | Munschauer | 192/67 R X |
| 2,639,014 | 5/1953 | Munschauer | 192/67 R X |
| 2,639,795 | 5/1953 | Munschauer | 192/67 R |
| 2,708,993 | 5/1955 | Munschauer | 192/67 R X |
| 2,770,150 | 11/1956 | Culverwell . | |
| 2,844,238 | 7/1958 | Peterson . | |
| 2,883,025 | 4/1959 | McKim . | |
| 2,913,929 | 11/1959 | Anderson . | |
| 3,055,471 | 9/1962 | Warn et al. . | |
| 3,058,558 | 10/1962 | Hawk . | |
| 3,123,169 | 3/1964 | Young et al. . | |
| 3,442,361 | 5/1969 | Hegar . | |
| 3,972,633 | 8/1976 | Wright . | |
| 4,147,226 | 4/1979 | Kleespies et al. . | |
| 4,212,557 | 7/1980 | Overbeek . | |
| 4,222,472 | 9/1980 | Telford . | |
| 4,223,772 | 9/1980 | Telford . | |
| 4,266,646 | 5/1981 | Telford . | |
| 4,282,949 | 8/1981 | Kopich et al. | 192/67 R X |
| 4,327,821 | 5/1982 | Telford . | |
| 4,341,281 | 7/1982 | Nagy . | |
| 4,365,696 | 12/1982 | Telford . | |

Primary Examiner—Tony M. Argenbright
Attorney, Agent, or Firm—Cullen, Sloman, Cantor Grauer, Scott & Rutherford

[57] ABSTRACT

The automatic free wheeling hub assembly includes a housing or body secured to the vehicle's wheel hub. The vehicle's drive axle extends into and is mounted in the body and wheel hub. The free wheeling hub assembly includes a cylindrical axle hub located in the interior of the body and spline connected to the splined end of the drive axle. The axle hub is provided with an external toothed section or series of circumferentially spaced teeth. A tubular clutch ring is mounted in the body for axial movement and is provided with internal teeth for engagement with the disengagement from the series of teeth provided on the axle hub. Fluid actuating means are provided in the body including a movable member in the form of a diaphragm or piston connected to the clutch ring for axially moving same relative to said axle hub in response to the pressure or pressure differential from a fluid source such as vacuum to effect the engagement and disengagement of the matching teeth of the axle hub and clutch ring.

26 Claims, 6 Drawing Figures

DEVICE FOR DISCONNECTING THE WHEELS FROM A VEHICLE'S OPTIONAL DRIVE

BACKGROUND OF THE INVENTION

There are known mechanical devices, both manual and automatic, designed to connect or disconnect the wheels from a vehicle's optional drive axles in order to achieve or obtain a significant fuel economy. This occurs when the wheels are released from the referred optional drive axles since part of the power generated by the engine will no longer be wasted in moving the components of the optional drive system that exist between the vehicle's wheels and the transfer case.

The prior art manual mechanical devices are not convenient since the driver has to step out of the vehicle to connect or disconnect the optional drive. The conventional automatic devices have the disadvantage of not allowing for engine compression braking.

As further background for the present invention, free wheeling hub assemblies are designed to drivingly connect wheels to the associated driving wheel axles which are provided with splines and upon which end of the axles the hubs are mounted. It is known that four wheel drive vehicles are meant to operate in conditions under which the maximum traction capability is required. When these conditions arise, the second driving axle, most usually the front one, is engaged by transferring engine power to it through a transfer case.

Under normal 4×2 conditions, however, the front power train is disconnected from the transfer case, but continues to turn, "dragged" by the wheels. This results in the additional resistance which increases fuel consumption and tire wear, causing unnecessary wear of the front power train moving parts, and reduced driveability.

These undesirable consequences are eliminated by the use of a hub clutch on each wheel, through which it is possible to disconnect the wheels from the drive shafts when desired. In vehicles equipped with the free wheeling hubs, when driving in 4×2, the wheels will be the only moving parts of the front drive line, just like in any conventional 2 wheel drive vehicle.

In the last three decades, numerous free wheeling mechanisms have been devised including manual hubs, automatic roller type hubs, automatic cam type hubs and axle disconnecting mechanisms. Manual hubs connect or disconnect the wheels to the drive shafts through different mechanical means, the most reliable of which consists of a sliding clutch ring, contained in a housing fixed on to the wheel hub, and externally controlled by a manual dial. Although the manual free wheeling hub serves its purpose, and is durable and trouble free, it has the obvious disadvantage of the driver having to get out of the vehicle every time the four wheel drive is required.

In automatic roller type hubs, when torque is applied to the drive shafts, the hubs lock themselves through the wedging of rollers between an inner polyhedric body splined on the shaft and the race of a housing, bolted on the wheel hub. Thus, the axle can drive the wheels but the wheels will not drag the power train. The main inconvenience of this mechanism is that engine compression braking cannot be applied to the front wheels, which, in difficult off-road operation, can be a serious handicap to the control of driver over vehicle.

In automatic cam type hubs the same principle as in the manual hub is applied, only that instead of being manually operated, the sliding clutch ring is displaced by a combination of cams and friction mechanisms when torque is applied to the drive shaft. To disengage the hubs, it is necessary to stop the vehicle and reverse it, for the clutch ring to return to its original position. Although this type does allow for engine compression braking, its reliability appears to be doubtful. In addition to the inconvenience of having to back up the vehicle, this rather complicated construction requires regular servicing, can be noisy in rough off-road situations, such as forward/reverse vehicle rocking, and is subject to failure under extreme low temperatures.

In a disconnecting mechanism or system, instead of featuring a locking device on each wheel, it consists of a split drive shaft on one side of the front axle gear. The shaft remains split when operating in 4×2 and is locked together by a remote control sliding sleeve for 4×4 operation. This system does not really provide a full free wheeling effect. Even in 4×2, the wheels drag the drive shaft on one side, part of the drive shaft on the other, and the differential gears. Only the ring/pinion gear and propeller shaft remain still when in 4×2. Although the system provides for the comfort of an in-cab operation the free wheeling effect is only partial since a substantial number of parts is permanently connected to the wheels. The vehicle's axle must also be specially designed and engineered to accommodate the shaft split mechanism.

Applicant attemted to solve the inconveniences of the prior art devices by developing a totally automatic mechanical device incorporating engine braking as is disclosed in his Brazilian Patent No. PI-8102668, filed Apr. 30, 1981. In this automatic mechanical device, the wheels are connected automatically when the optional drive is actuated by means of the transfer case lever. Disconnection is accomplished by disengaging the optional drive, also through the transfer case lever. However, in order to disconnect the wheels completely, it is necessary to move the vehicle in the opposite direction to that of its previous movement.

Even though the automatic mechanical device described in the above patent did present some advantages when compared to other existing devices at that time, the applicant continued his studies and research towards obtaining a more practical solution to the problem of the prior art since his automatic mechanical device still presented the inconvenience of having to move the vehicle in a direction contrary to that of its previous movement in order to completely disengage the wheels.

BRIEF SUMMARY OF THE INVENTION

The present invention relates to an improvement on a device for disconnecting the wheels from a vehicle's optional drive in which the "engaged" and "disengaged" modes of the improved device are accomplished by means of a fluid system such as a pneumatic, hydraulic, or vacuum system which is easily and conveniently actuated by the user through a control valve located inside the vehicle.

A feature of the present invention is to provide automatic free wheeling hub assemblies for releasing the wheels from a vehicle's optional drive according to which the connection and disconnection of the vehicle's wheels and their respective optional drive axles are achieved automatically by means of a pneumatic, hydraulic, or vacuum system, actuated by the user through a control valve placed inside the vehicle. The valve may or may not be coupled to the optional drive transfer case lever. The valve, when actuated, causes a pressure unbalance inside the device that generates the movement of the engaging/disengaging element or member thereby determining the subsequent release or connection of the wheels and the drive axles.

Another feature of the present invention is that the engagement or disengagement of the optional traction wheels is automatically accomplished and there is no need or requirement for moving the vehicle in a direction opposite to that of its previous movement. This feature constitutes a significant advantage with respect to other known devices including applicant's earlier automatic mechanical device mentioned previously.

Still another feature is to provide a simple, reliable, self contained free wheeling system which is extremely easy to install on a vehicle and is applicable on virtually any size of drive axle, or type of axle construction, i.e.: floating or semi-floating, live-spindle, etc.

A further feature is to provide an automatic free wheeling hub assembly which is extremely simple in construction and requires only a few modifications of the existing spindle.

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

Figure 1:
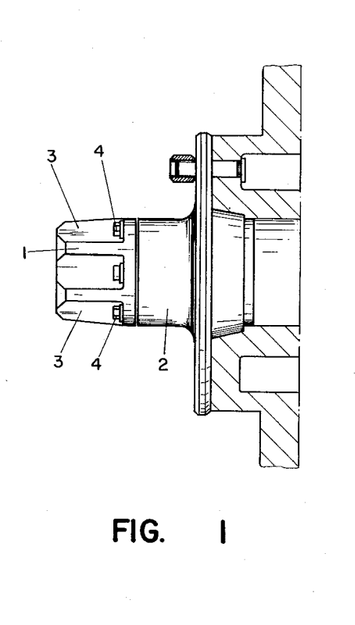
FIG. 1 is a fragmentary side elevational view, partly in section, of the automatic free wheeling hub assembly housing or body, attached to the wheel hub of the vehicle and illustrating one method of fixing or attaching the housing to the wheel hub.
Figure 2:
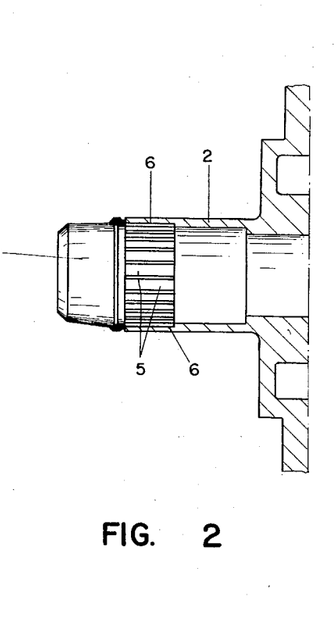
FIG. 2 is a similar view to FIG. 1 and illustrating another method of attaching the housing to the wheel hub.
Figure 3:
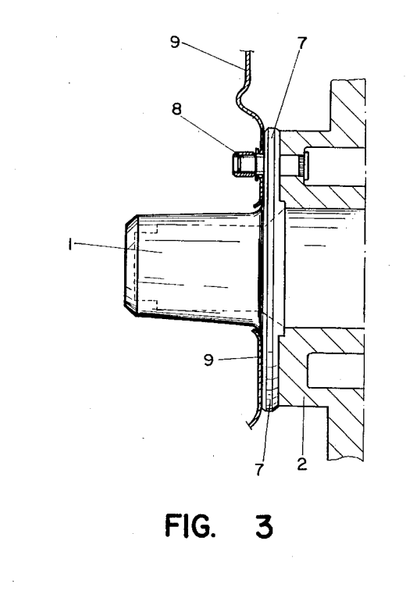
FIG. 3 is a view similar to FIGS. 1 and 2 and illustrating still another method of fixing or attaching the housing to the wheel hub.

The present invention is used with vehicles that are equipped with more than one drive or driving axle, according to which the device, unit or assembly is mounted inside an external body 1, which constitutes the support for the entire unit or assembly and is fixed, through various fastening means, to the vehicle's wheel hub 2. Three different fixing examples or methods are shown in FIGS. 1, 2 and 3. The body 1 contains inside thereof the device for the release of the optional drive.

In FIG. 1 the body 1 shows threaded holes 3 for the introduction of the fixing screws 4 into the wheel hub 2. In FIG. 2 the body 1 is provided with external splines 5 that fit onto the internal splines 6 located on the wheel hub 2. In FIG. 3 the body 1 is provided with a flange 7 containing holes or openings that match the openings provided in wheel hub 2 and in the wheel rim 9. Regular fixing screws 8 are utilized to fasten the body 1 and the rim 9 to the wheel hub 2.

Figure 4:
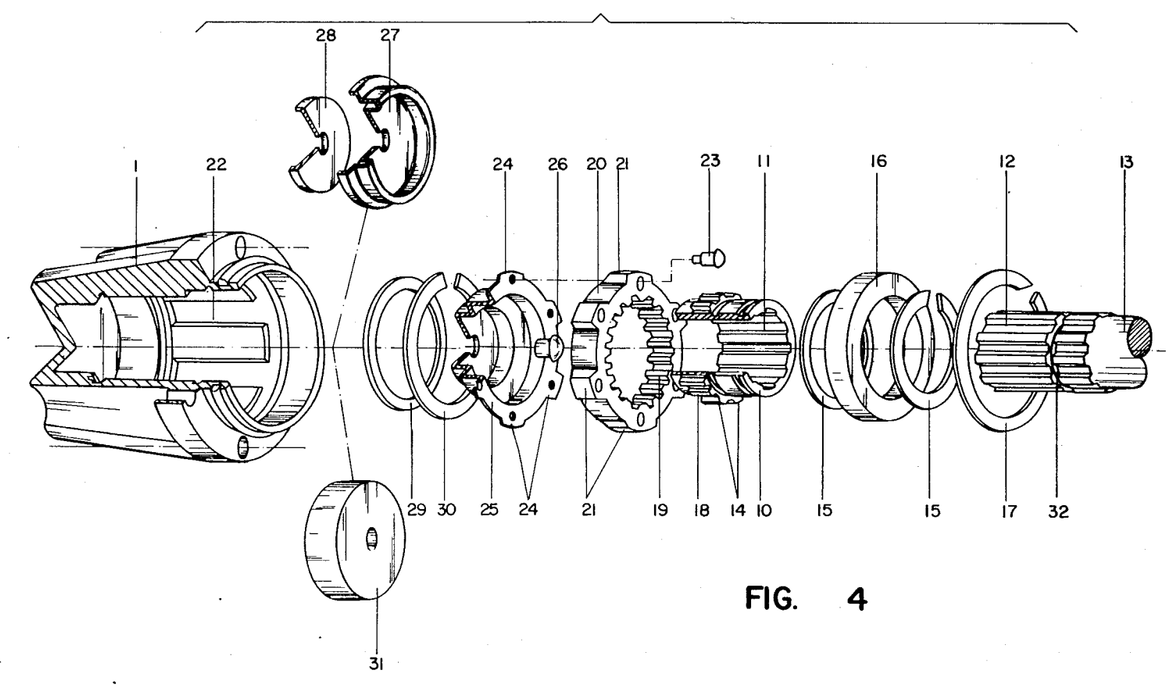
FIGS. 4 and 5 are exploded perspective views, in sequence of each other, depicting the internal parts or components that constitute, when assembled, the free wheeling hub assembly of the present invention. Certain of the components are broken away and sectioned for clarity and to illustrate certain structural features thereof.
Figure 5:
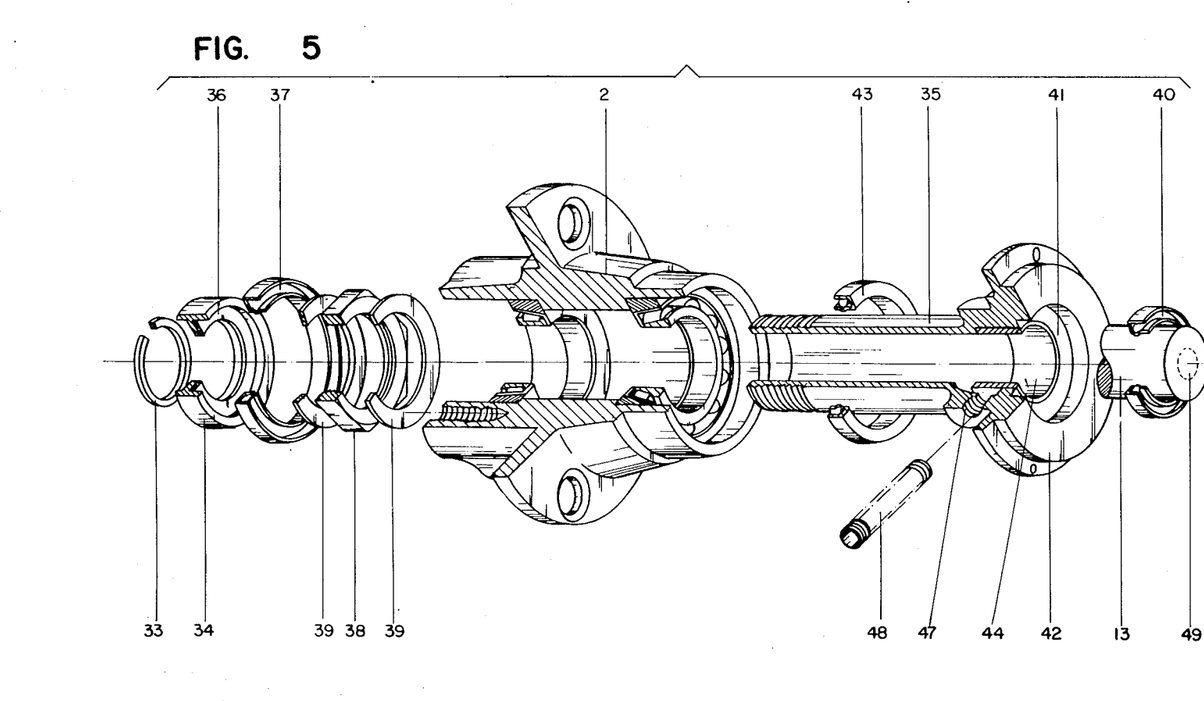
Figure 6:
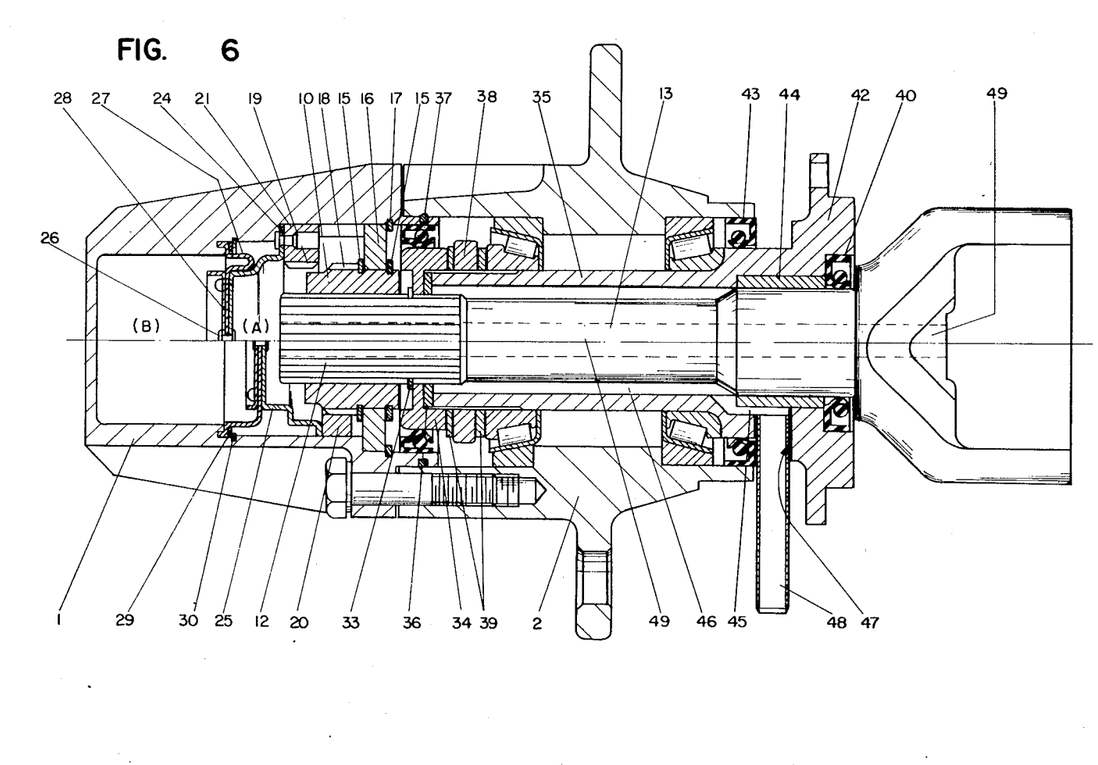
FIG. 6 is a longitudinal sectional view through the automatic free wheel hub assembly or device mounted on the axle, and illustrating both the engaged and disengaged positions of the device with respect to the center line of the assembly. The top part of the drawing shows the device in its disengaged position while the bottom part of the drawing shows the device in the engaged position.

Inside the housing or body 1, the device for the release of the optional drive is installed as illustrated in FIGS. 4 and 5. It is composed of a cylindrical axle hub 10 having internal splines 11 that are coupled to the external splines 12 provided on the vehicle's axle shaft 13. The axle hub 10 has a pair of external annular grooves 14 which are spaced apart and into which the snap rings 15 are fitted. A bearing 16 is placed on the axle hub 10 between the snap rings 15 and is fixed to the internal part of the body 1 by another snap ring 17 as shown in FIG. 6.

The axle hub 10 has adjacent to the internal snap ring 15 a small externally toothed section 18 that matches with the internal teeth 19 provided on the clutch ring 20. Ring 20, in the present invention, is the determining element for the "engaged" and "disengaged" modes or positions in between the drive axle or shaft 13 and the external body 1, as explained previously. The clutch ring 20 has on its outside or exterior a series of locking teeth 21 that matches with the axially extending, circumferentially spaced longitudinal slots or grooves 22 that exist or are found inside the body 1 and onto which are fixed through a conventional method the radial projections 24 of the actuating disc 25. The ring 20 and actuating disc 25 are attached by rivets 23.

In the first constructive embodiment the actuating disc 25 has at its center a central rivet or pin 26 that fixes the flexible or movable diaphragm 27 and another disc 28 to the actuating disc 25. This diaphragm 27 is attached to the body 1 by means of a washer 29 and a snap ring 30. In a second constructive embodiment, the central rivet 26 attaches and secures a piston 31 to the actuating disc 25, with th piston 31 adapted to slide inside the body 1. The diaphragm 27 and the piston 31 each constitutes a "movable member" as that term is used in the claims.

The splined section 12 of the axle or shaft 13 has an annular groove 32 in which is located a snap ring 33. A sealing nut 34 with a smooth outside diameter, is threaded onto one end of the spindle 35. Nut 34 together with gasket 36 and seal 37 are attached or fitted onto the body 1 thereby forming the sealing unit for said one end of the spindle 35. Nuts 38 and lock washers 39 are used as or constitute the fixing elements to secure the spindle 35 to the wheel hub 2.

The opposite end of the mentioned spindle 35 is sealed by an oil seal 40. The seal 40 is housed in an annular recess 41 that is machined on the flange 42 of the spindle 35. The seal 40 is in contact with the system's drive axle 13. Another seal 43 is used at the end of the vehicle's wheel hub 2 as shown in FIG. 6.

Affixed to the internal part of the spindle's 35 end, a bearing 44 is used that establishes or forms a small canal or passage 45, in connection with the radial spacing 46, formed by or between the drive axle 13 and the spindle 35. The canal 45 is also connected to an orifice or opening 47 drilled on the spindle's 35 external part, to which a tube 48 is fixed. The tube 48 is connected by flexible hoses, not shown, to the vehicle's chassis.

Alternatively, tube 48 could be fixed to the end of an orifice or passage 49 drilled longitudinally on the drive axle 13 itself. In such a construction the connecting canal 45 would not be required.

With the unit or device in "disengaged" position, as illustrated on the top part of FIG. 6, the internal teeth 19 of the clutch ring 20 are not meshed with the toothed section 18 of the axle hub 10, which allows for or permits the free rotation of the wheel hub 2. At such time the axle hub 10 and consequently the drive axle 13 are motionless and the optional drive is disconnected. In other words, in "disengaged" position, the free rotation of the vehicle's wheel hub 2 causes the body 1, connected to it to rotate, as well as all the other parts or components in its interior. The components are the clutch ring 20, the actuating disc 25, and the diaphragm 27/internal disc 28 assembly, when considering the first constructive embodiment, or the piston 31, when considering the second embodiment or version. Since the clutch ring 20 is not engaged onto the axle hub 10, it remains still, as well as the system's drive axle 13. At such time the vehicle's wheel hub 2 is free to rotate, as well as the parts or components described above.

In this disengaged position, the pressure existing inside chamber A is equal to that existing inside chamber B which is completely sealed. For the device or assembly to shift to the engaged position, a difference in pressure must be generated between these two chambers A and B. This is obtained through vacuum, pneumatic, or hydraulic pressure originating in the vehicle's intake system, or by an auxiliary pump. The term "fluid" as used herein and in the claims includes any type of vacuum, pneumatic or hydraulic source.

The flow of such fluids (vacuum, air, or oil) is controlled by a control valve, not illustrated, that may or may not be connected to the optional drive actuating lever. The fluids are conducted via flexible hoses, not shown, from the engine or the auxiliary pump, to the tube 48, that may be attached onto the orifice 47 drilled on the spindle's 35 end, or onto an orifice, passage or opening 49 located in the drive axle 13.

In the first case, the fluids (vacuum, air, or oil) are conducted through the canal 45, to the radial spacing 46 found in between the drive axle 13 and the spindle 35; then to and entering chamber A, through the existing splines 12 provided on the axle 13. In the second case, the fluids (vacuum, air or oil) also reach chamber A, but are directed through the axle's 13 internal longitudinal hole or orifice 49. The fluid is prevented from leaking through the spindle's 35 ends, since on one end, the spindle is closed by the sealing unit formed by the sealing nut 34, the gasket 36 and the seal 37, while on the other end, it is sealed by the seal 40.

When the fluid from the power source (vacuum, air, or oil) reaches chamber A generating a difference in pressure between it and chamber B, the pressure differentials cause the diaphragm 27, in the first constructive version, or the piston 31, in the second version, to move axially. Since either diaphragm 27, or the piston 31 is coupled to the actuating disc 25 and the clutch ring 20, these last two members are "pushed" towards the axle hub 10, causing the perfect meshing of the internal teeth 19 provided on ring 20 onto the toothed section 18 provided on the axle hub 10, as shown in the bottom part of FIG. 6.

Once the engagement between the clutch ring 20 and the axle hub 10 is established, the optional drive disconnecting device is engaged or locked to the drive axle 13; that is, the body 1 turns together with the axle hub 10, and the latter together with the drive axle 13 (optional drive connected).

To re-establish the disengagement, all that is required is to interrupt the flow of fluid from the power source (vacuum, air, or oil). This is accomplished through the control valve, that restores the equilibrium in pressure between the two chambers A and B. This causes the subsequent return of the diaphragm 27 or the piston 31 to its original position. Since these are coupled to the actuating disc 25 and the clutch ring 20, they cause the disengagement of the clutch ring's teeth 19 from the toothed section of the axle hub 10. Thus the unit or device remains disengaged, allowing the vehicle's wheel hub 2 to turn freely, independent from the axle hub 10 and the drive axle 13.

When vacuum is used, to disengage the clutch ring 20, vacuum is relieved from chamber A through the same control valve. Since chamber B is completely sealed, depression in it acts as a return spring to move the diaphragm 27 and clutch ring 20 back to disengaged position in which both chambers A and B are at atmospheric pressure. With this new device or assembly, the engagement and disengagement of the optional drive wheels is done automatically, simultaneously or not with the actuation of the optional drive shift lever, avoiding the need to move the vehicle in a direction opposite to its previous movement, thus allowing for greater user convenience and a more practical unit.

The free wheeling system just described offers all the advantages of the manual hub as well as those of the automatic ones of the prior art. The advantages are: in-cab operation at any speed; engine compression brake capability; no reversing to disengage; entire front power train motionless in 4×2; complete reliability; and simple construction and ease of installation.

The free wheeling system consists of a set or pair of locking hubs that are actuated by vacuum, air or hydraulic power appropriately routed to the wheels and controlled by a valve operated, as an example, in conjunction with the transfer case shifting mechanism.

Standard seals at both ends of the spindle ensure efficient and durable sealing of the unit. In a vacuum power system an appropriate reservoir and check valve maintain adequate vacuum supply for instantenous locking and unlocking action under all engine operating conditions. Durability of the vacuum actuating mechanism is achieved. During the entire life of the vehicle, the diaphragm will perform significantly less cycles than similar diaphragms utilized in fuel pumps and with brake boosters. With the vacuum version the following components are utilized: one vacuum reservoir; one vacuum check valve; one vacuum switch; one set of hoses and connections; and one set of free wheeling hubs.

Installation of the vacuum system is extremely simple, since it is practically an add-on unit. The only modification required is on the spindle, on which the vacuum inlet needs to be drilled and a seal seat provided. Apart from this, a totally standard front axle may be used.

When compared with other existing free wheeling systems, the present invention provides a unique combination of positive features including: the driver is not required to get out of the vehicle to lock or unlock the hubs; permanent locking action ensures engine compression braking on front wheels in 4×4; it is not necessary to reverse the vehicle to disengage hubs; in 4×2, front wheels turn completely free from the drive shaft;

entire front power train remains absolutely still; instantaneous positive locking and unlocking, operated simultaneous with transfer case shifting; allows for 4 wheel drive to be engaged in motion provided the vehicle is equipped with the means to rotate front power train prior to engagement; simple construction; hubs contain virtually one moving part, the clutch ring; reliability; sturdy torque transmitting components extensively proven on manual hubs; and the system of the present invention is unaffected by severe operating conditions or extreme climatic environments.

Having described the invention, reference should now be had to the following claims.

I claim:

1. An automatic free wheeling hub assembly for a four wheel drive vehicle to drivingly connect a wheel to the associated vehicle's drive axle shaft which has a longitudinally extending axis and is provided with external splines on one end thereof;

said hub assembly comprising a housing hub having an axial bore through which the shaft extends;

a body having a cavity aligned with said bore, with one end of said body abutting an end face of said housing hub and the other end of said body being closed, said body having an internal section of slots;

means securing said body to said housing hub;

means in said housing hub for mounting said hub assembly on the spline end of the shaft, with said housing hub completely surrounding the shaft and with the spline end thereof extending into the cavity of said body;

a cylindrical axle hub provided with internal splines and mounted on and carried by the spline end of the shaft within said cavity;

said axle hub having an integral toothed section of teeth on the exterior thereof;

an axially movable clutch ring located in the cavity of said body and spaced from the spline end of the shaft, said clutch ring having an internal section of teeth for selective engagement with the teeth on said axle hub carried by the shaft;

said clutch ring having an external section of locking teeth located in and movable along the internal slots provided in said body;

fluid responsive actuating means including a movable member located in said cavity axially opposite the spline end of the shaft;

said movable member dividing said cavity into a pair of fluid chambers; and means securing said movable member to said clutch ring;

said fluid responsive actuating means being responsive to a pressure differential in said chambers thereby moving said movable member and said clutch ring axially in said cavity to effect engagement or disengagement of the teeth of said clutch ring and said axle hub;

said body, hub housing, movable member and clutch ring when disengaged from said axle hub, being adapted to turn freely as a unit, independent from said axle hub and the shaft.

2. The automatic free wheeling hub assembly defined in claim 1 wherein said movable member is in the form of an expandable diaphragm having its peripherial edge fixed in said body; and said ring securing means is in the form of an actuating disc which is located between said diaphragm and said clutch ring, said actuating disc having one portion secured to said clutch ring and another portion secured to and movable with said diaphragm.

3. The automatic free wheeling hub assembly defined in claim 1 wherein said movable member is in the form of a piston sealing fitted in the cavity of said body and dividing said cavity into said pair of fluid chambers; and said ring securing means is in the form of an actuating disc which is located between said piston and said clutch ring, said actuating disc having one portion secured to said clutch ring and another portion secured to and movable with said piston.

4. The automatic free wheeling hub assembly defined in claim 1 wherein said means in said housing hub for mounting said hub assembly include a tubular spindle provided in the axial bore of said housing hub and through which the vehicle's drive axle shaft extends and is mounted, with the outer periphery of the shaft being spaced from the interior wall of said spindle to define an annular recess communicating on one end with the splines provided on the shaft and the opposite fluid chamber and the movable member; and passage means provided in said spindle communicating with said annular recess and adapted to be connected to a source of fluid for directing the fluid to said annular recess and to said opposite chamber.

5. The automatic free wheeling hub assembly defined in claim 4 wherein said tubular spindle has inner and outer ends; with the inner end of said spindle being spaced axially from said axle hub and surrounding and being radially spaced from the spline end of the shaft; means for sealing said inner end of said spindle including a gasket and a sealing nut both carried by the spline end of said shaft; said nut holding said gasket against the inner end of said spindle; and a seal surrounding said sealing nut and mounted in the cavity of said body.

6. The automatic free wheeling hub assembly defined in claim 5 wherein the outer end of said spindle is provided with an annular recess; an oil seal located in said recess and surrounding the drive axle shaft; and an additional seal surrounding the outer periphery of said spindle and mounted in the cavity of said housing hub.

7. The automatic free wheeling hub assembly of claim 1 wherein a longitudinally extending orifice is provided in the vehicle's drive axle shaft and extends from one end thereof to the other end; said orifice terminating adjacent said actuating means and movable member; with the other end of said orifice being adapted to be connected to a fluid source.

8. The automatic free wheeling hub assembly of claim 1 wherein said means in said housing hub for mounting said hub assembly include a tubular spindle provided in the axial bore of said housing hub and through which the vehicle's drive axle shaft extends and is mounted; and a longitudinally extending orifice provided in the vehicle's drive axle shaft extending from one end thereof to the other end; said orifice terminating adjacent said actuating means and movable member; with the other end of said orifice being adapted to be connected to a fluid source.

9. The automatic free wheeling hub assembly defined in claim 1 wherein the axial movement of said fluid responsive actuating means and movable wall is accomplished by means of vacuum, pneumatic or hydraulic pressure.

10. The automatic free wheeling hub assembly defined in claim 1 wherein an annular bearing is mounted on and carried by said axle hub, with the outer periphery of said bearing engaging and being supported by the wall of the cavity of said body; and means mounting said bearing and axle hub in said body.

11. The automatic free wheeling hub assembly defined in claim 1 wherein said cylindrical axle hub is provided with a pair of axially spaced apart annular grooves on the outer periphery thereof; an annular bearing carried by said axle hub in the space between said annular grooves, the outer periphery of said bearing engaging and being supported by the wall of the cavity of said body; and means mounting said bearing and said axle hub in said body including snap rings in said grooves engaging and holding said bearing against axial movement.

12. An automatic free wheeling hub assembly for a four wheel drive vehicle to drivingly connect a wheel to the associated vehicle's drive axle shaft which has a longitudinally extending axis and is provided with external splines on one end thereof;

said hub assembly comprising a housing hub having an axial bore through which the shaft extends;

a body having a cavity aligned with said bore, with one end of said body having an annular surface abutting an end face of said housing hub and the other end of said body being closed, said body having an internal section of slots;

means securing said body to said housing hub;

means in said housing hub for mounting said hub assembly on the spline end of the shaft, with said housing hub completely surrounding the shaft and with the spline end thereof extending into the cavity of said body;

a cylindrical axle hub provided with internal splines and mounted on and carried by the spline end of the shaft within said cavity;

said axle hub having an integral toothed section of teeth on the exterior thereof;

an axially movable clutch ring located in the cavity of said body and spaced from the spline end of the shaft, said clutch ring having an internal section of teeth for selective engagement with the teeth on said axle hub carried by the shaft;

said clutch ring having an external section of locking teeth located in and movable along the internal slots provided in said body;

actuating means including a movable member located in said cavity axially opposite the spline end of the shaft;

said movable member dividing said cavity into a pair of chambers; and means securing said movable member to said clutch ring;

said actuating means being responsive to a force for moving said movable member and said clutch ring axially in said cavity to effect engagement or disengagement of the teeth of said clutch ring and said axle hub;

said body, hub housing, movable member and clutch ring when disengaged from said axle hub, being adapted to turn freely as a unit, independent from said axle hub and the shaft.

13. The automatic free wheeling hub assembly defined in claim 12 wherein said movable member is in the form of an expandable diaphragm having its peripherial edge fixed in said body; and said ring securing means is in the form of an actuating disc which is located between said diaphragm and said clutch ring, said actuating disc having one portion secured to said clutch ring and another portion secured to and movable with said diaphragm.

14. The automatic free wheeling hub assembly defined in claim 12 wherein said movable member is in the form of a piston sealing fitted in the cavity of said body and dividing said cavity into said pair of chambers; and said ring securing means is in the form of an actuating disc which is located between said piston and said clutch ring, said actuating disc having one portion secured to said clutch ring and another portion secured to and movable with said piston.

15. The automatic free wheeling hub assembly defined in claim 12 wherein said means in said housing hub for mounting said hub assembly include a tubular spindle provided in the axial bore of said housing hub and through which the vehicle's drive axle shaft extends and is mounted, with the outer periphery of the shaft being spaced from the interior wall of said spindle to define an annular recess communicating on one end with the splines provided on the shaft and the opposite chamber and the movable member; and passage means provided in said spindle communicating with said annular recess and adapted to be connected to a source of fluid for directing fluid to said annular recess and to said opposite chamber.

16. The automatic free wheeling hub assembly defined in claim 12 wherein said means in said housing hub for mounting said hub assembly include a tubular spindle provided in the axial bore of said housing hub and through which the vehicle's drive axle shaft extends and is mounted; and a longitudinally extending orifice provided in the vehicle's drive axle shaft extending from one end thereof to the other end; said orifice terminating adjacent said actuating means and movable member; with the other end of said orifice being adapted to be connected to a fluid source.

17. The automatic free wheeling hub assembly defined in claim 12 wherein the axial movement of said actuating means and movable wall is accomplished by means of vacuum, pneumatic or hydraulic pressure.

18. An improved wheel drive disengagement device for disengaging a hub (2) of an optional drive wheel from an axle (13) comprising:

a body (1) secured to the hub (2), the body (1) defining an internal bore having a plurality of longitudinally extending grooves (22);

a cylindrical axle hub (10) having a central opening;

a plurality of splines (11) formed in the central opening;

a splined end (12) formed on one end of the axle (13) to selectively engage the plurality of splines (11);

the axle hub (10) having a pair of spaced annular grooves (14) which receive internal snap rings (15);

a bearing (16) attached to the axle hub (10) between the snap rings (15), and the bearing (16) being attached to the body (1) by another snap ring (17) which is received in an annular groove formed in the internal bore of the body (1);

a plurality of external teeth (18) formed on the axle hub (10) adjacent to one of the internal snap rings (15);

a ring (20) having internal teeth (19) for selectively engaging the external teeth (18), said ring (20) having external locking teeth (21) corresponding to and received in the grooves (22);

an actuating disc (25) fastened to the body (1), the actuating disc having a central opening formed therein;

a diaphragm (27) secured to the body (1) adjacent to the actuating disc (25) by a snap ring (30) and a washer (29), the diaphragm (27) having a central opening formed therein;

a disc (28) disposed adjacent to the diaphragm (27), the disc (28) having a central opening formed therein;

a pin (26) secured to and extending through the central openings formed in the actuating disc (25), the diaphragm (27) and the disc (28);

a spindle (35) secured on a first end to the hub (27) by fasteners;

a sealing nut (34) having a smooth external surface being secured to the spindle (35) by a snap ring (33) which is retained in an annular groove formed in the splined end (12) of the axle (13);

a gasket (36) secured to the spindle (35) adjacent the sealing nut (34) for sealing therebetween;

a seal (37) fitted into the internal bore of the body (1) on one end, the seal engaging the smooth external surface of the sealing nut (34) for forming a seal between the spindle (35) andthe body (1);

a second end of the spindle (35) having an annular recess (41) formed in a flange (42) in which an oil seal (40) is retained, the oil seal maintaining contact with the axle (13);

a seal (43) and a bearing (44) are secured within one end of the hub (3), the bearing (44) being secured to the spindle (35) and the seal (43) maintaining contact with the spindle (35);

the spindle (35) having an orifice (47) formed adjacent the flange (42), the orifice (47) being open to a radial space (46) formed between the axle (13) and the spindle (35);

a tube (48) connected to the spindle (35) and open to the orifice (47), said tube being adapted to be interconnected through flexible hoses to a source of fluid pressure.

19. The improved wheel drive disengagement device of claim 18 wherein said axle (13) has an orifice (49) extending longitudinally therein to which said tube (48) is connected for fluid communication therethrough.

20. The improved wheel drive disengagement device of claim 18 wherein the source of fluid pressure for moving the diaphragm (27) is a pneumatic vacuum.

21. The improved wheel drive disengagement device of claim 18 wherein the source of fluid pressure for moving the diaphragm (27) is pneumatic pressure.

22. The improved wheel drive disengagement device of claim 18 wherein the source of fluid pressure for moving the diaphragm (27) is hydraulic pressure.

23. An improved wheel drive disengagement device for disengaging a hub (2) of an optional drive wheel from an axle (13) comprising:

a body (1) secured to the hub (2), the body (1) defining an internal bore having a plurality of longitudinally extending grooves (22);

a cylindrical axle hub (10) having a central opening;

a plurality of splines (11) formed in the central opening;

a splined end (12) formed on one end of the axle (13) to selectively engage the plurality of splines (11);

the axle hub (10) having a pair of spaced annular grooves (14) which receive internal snap rings (15);

a bearing (16) attached to the axle hub (10) between the snap rings (15), and the bearing (16) being attached to the body (1) by another snap ring (17) which is received in an annular groove formed in the internal bore of the body (1);

a plurality of external teeth (18) formed on the axle hub (10) adjacent to one of the internal snap rings (15);

a ring (20) having internal teeth (19) for selectively engaging the external teeth (18), said ring (20) having external locking teeth (21) corresponding to and received in the grooves (22);

an actuating disc (25) fastened to the body (1), the actuating disc having a central opening formed therein;

a piston (31) secured to the body (1) adjacent to the actuating disc (25) by a snap ring (30) and a washer (29), the piston (31) having a central opening formed therein;

a pin (26) secured to and extending through the central openings formed in the actuating disc (25) and the piston (31);

a spindle (35) secured on a first end to the hub (27) by fasteners;

a sealing nut (34) having a smooth external surface being secured to the spindle (35) by a snap ring (33) which is retained in an annular groove formed in the splined end (12) of the axle (13);

a gasket (36) secured to the spindle (35) adjacent the sealing nut (34) for sealing therebetween;

a seal (37) fitted into the internal bore of the body (1) on one end, the seal engaging the smooth external surface of the sealing nut (34) for forming a seal between the spindle (35) and the body (1);

a second end of the spindle (35) having an annular recess (41) formed in a flange (42) in which an oil seal (40) is retained, the oil seal maintaining contact with the axle (13);

a seal (43) and a bearing (44) are secured within one end of the hub (2), the bearing (44) being secured to the spindle (35) and the seal (43) maintaining contact with the spindle (35);

the spindle (35) having an orifice (47) formed adjacent the flange (42), the orifice (47) being open to a radial space (46) formed between the axle (13) and the spindle (35);

a tube (48) connected to the spindle (35) and open to the orifice (47), said tube being adapted to be interconnected through flexible hoses to a source of fluid pressure.

24. The improved wheel drive disengagement device of claim 23 wherein the source of fluid pressure for moving the piston (31) is a pneumatic vacuum.

25. The improved wheel drive disengagement device of claim 23 wherein the source of fluid pressure for moving the piston (31) is pneumatic pressure.

26. The improved wheel drive disengagement device of claim 23 wherein the source of fluid pressure for moving the piston (31) is hydraulic pressure.

* * * * *